Figure 1:
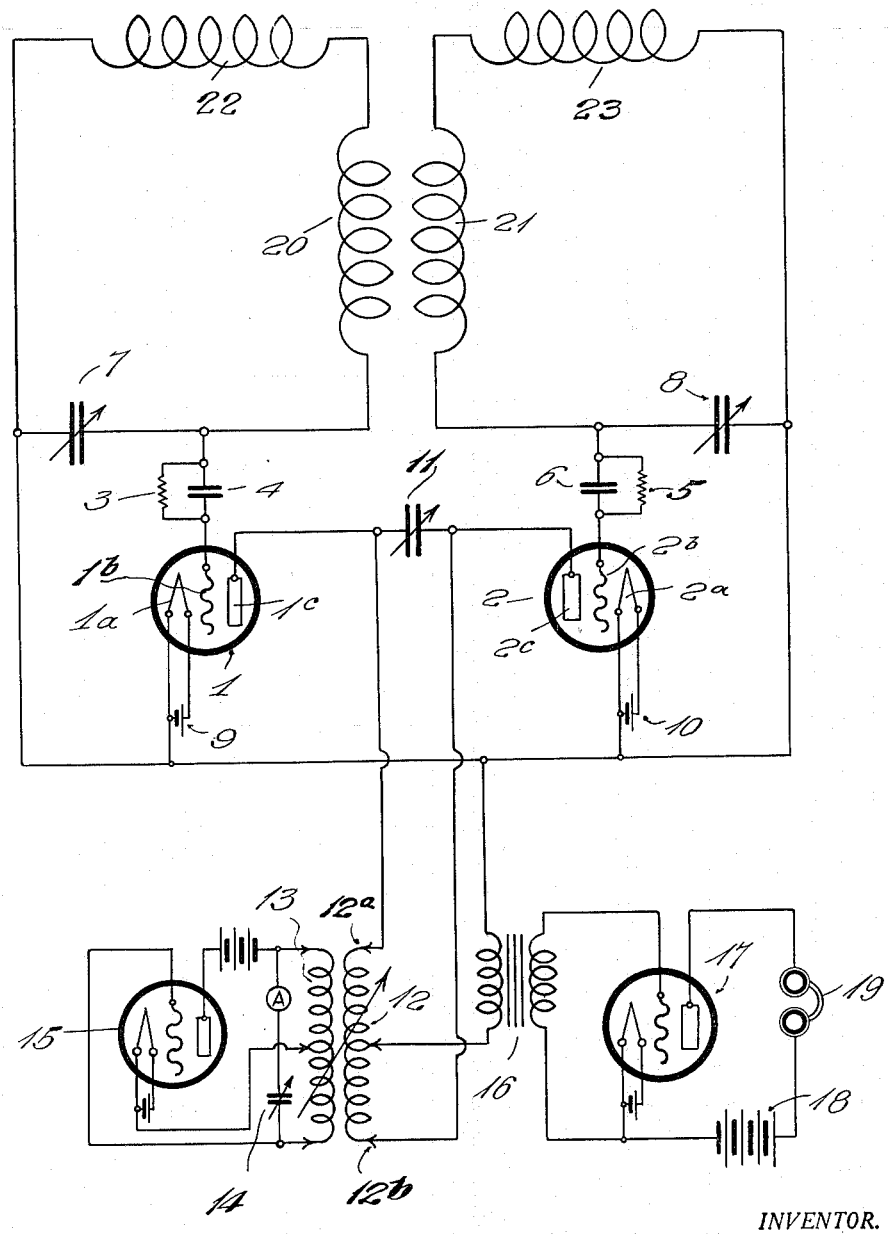

June 5, 1934.  J. A. WILLOUGHBY  1,961,319
RADIO DIRECTION FINDING SYSTEM
Filed Jan. 8, 1929   4 Sheets-Sheet 1

INVENTOR.
John A. Willoughby,
BY John C. Brady
ATTORNEY.

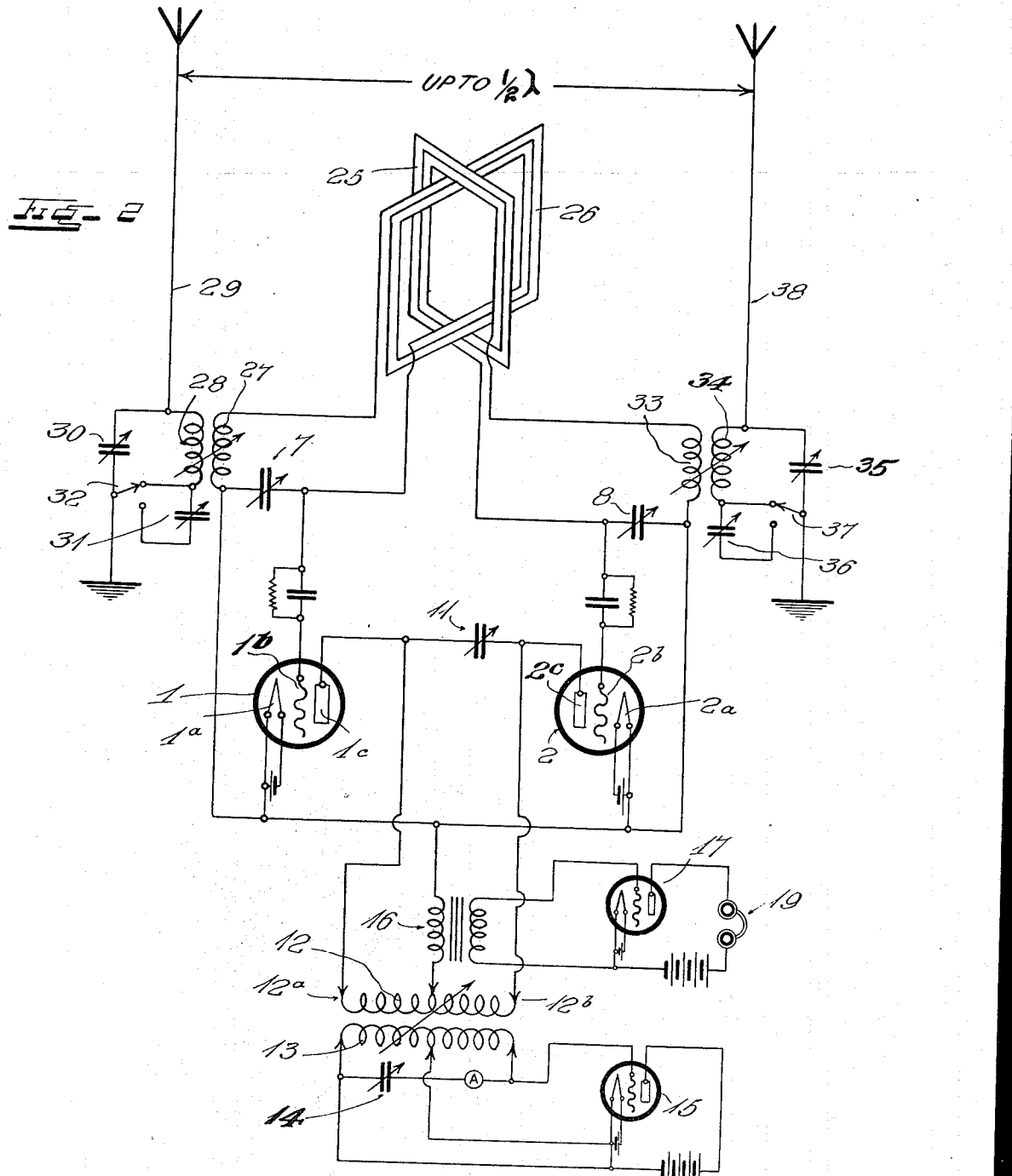

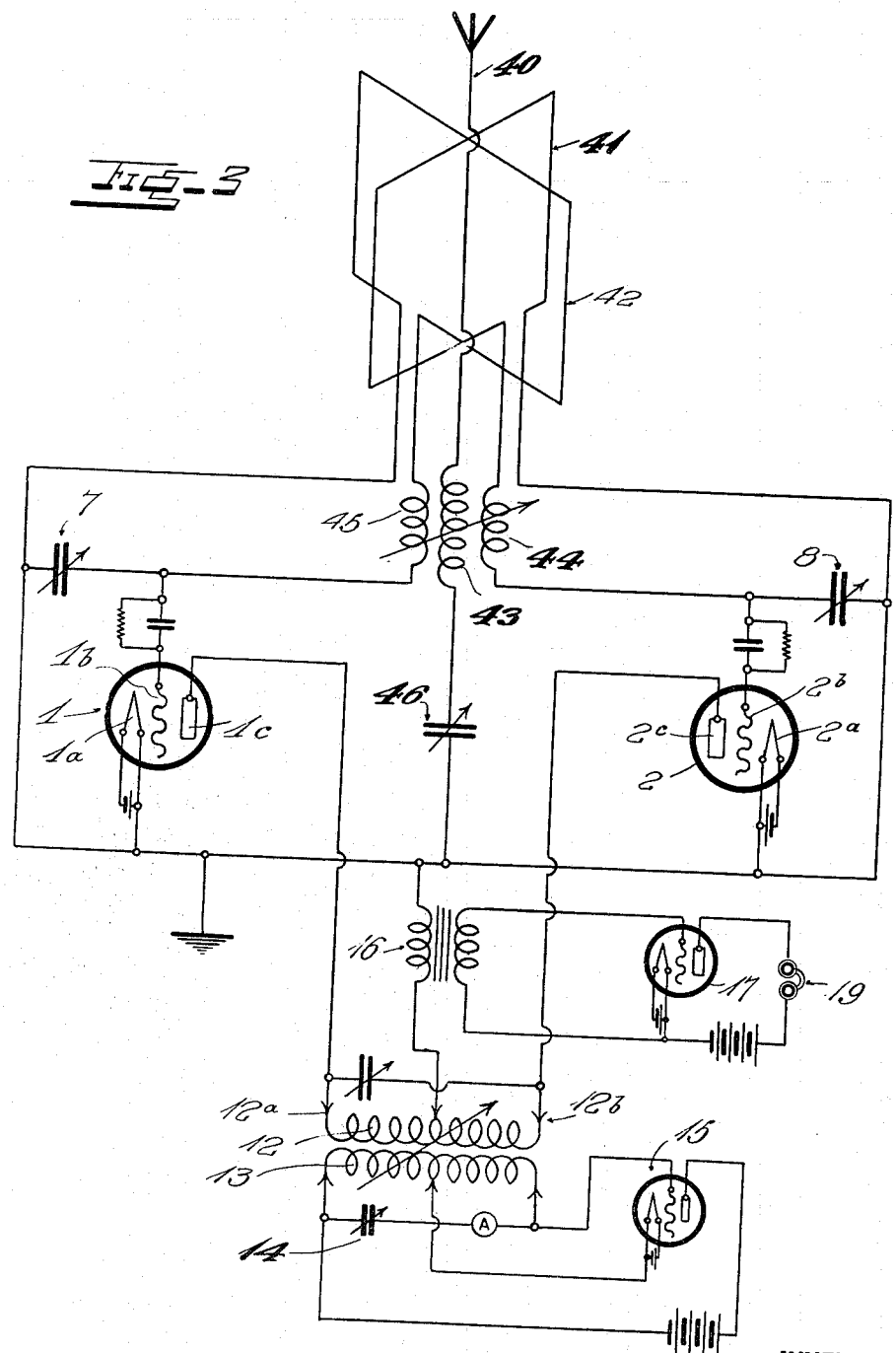

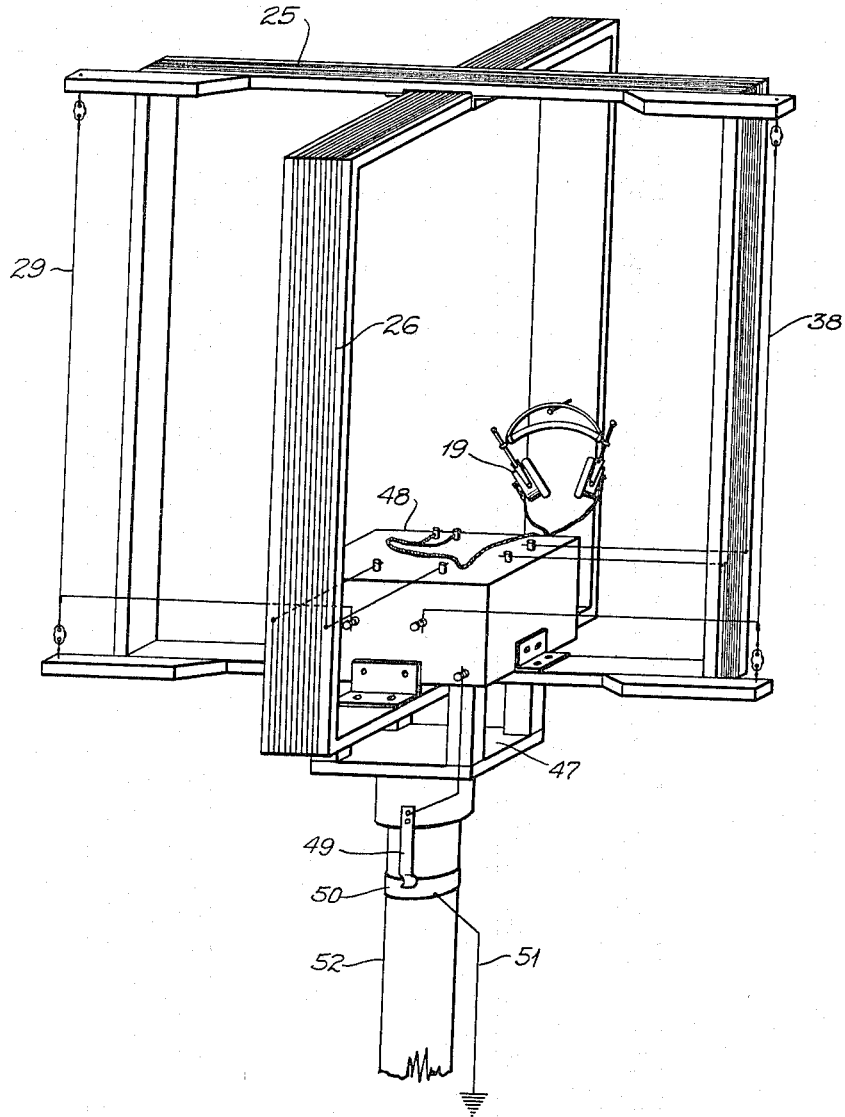

Patented June 5, 1934

1,961,319

UNITED STATES PATENT OFFICE 1,961,319

RADIO DIRECTION FINDING SYSTEM

John A. Willoughby, Cambridge, Mass.

Application January 8, 1929, Serial No. 331,001

7 Claims. (Cl. 250—11)

This invention relates broadly to signal reception systems in general and more specifically to directional signal receiving systems.

An object of this invention is to provide a signal receiving system having unidirectional receiving characteristics.

Another object of this invention is to provide a signal receiving system in which the direction of the signal transmitting station may be readily determined.

Still another object of this invention is to provide a signal receiving system in which a plurality of antennæ are coupled to periodically energized electron discharge devices whereby signaling energy from definite predetermined directions is intermittently received whereby the direction of the signaling station may be readily determined.

Other objects and features of this invention will be apparent to those skilled in the art to which this invention pertains from the following specification and the appended claims.

According to this invention a signal receiving system is provided with a plurality of antennæ. The fields of these antennæ are so restricted that as the receiving system is caused to function by virtue of signaling energy received from each of the antennæ successively and periodically the direction of the signaling station is determined.

In the drawings Figure 1 is a diagrammatic illustration of a circuit employed in this invention; Fig. 2 illustrates an embodiment of this invention, Fig. 3 illustrates another embodiment of this invention, Fig. 4 is a perspective view of the embodiment diagrammatically shown in Fig. 2.

Referring now to Fig. 1, two electron tubes 1 and 2 are shown, the tube 1 having a cathode $1a$, a control electrode $1b$ and an anode $1c$, while the tube 2 has corresponding electrodes $2a$, $2b$ and $2c$ respectively. Grid leak resistance units 3 and 5 and grid condensers 4 and 6 are connected to the control electrodes $1b$ and $2b$ respectively. Tuning condensers 7 and 8 are associated with the input circuits of electron discharge devices 1 and 2, respectively. Sources 9 and 10 are connected with the cathodes $1a$ and $2a$ respectively. Variable condenser 11 is connected across the inductance 12, the terminals $12a$ and $12b$ of which are connected to the anodes $1c$ and $2c$, respectively. Inductance 13 is coupled to the inductance 12. Capacity 14 is connected across the inductance 13. Electron discharge device 15 is associated with the inductance capacity circuit 13, 14. Low frequency transformer 16 is connected to the electrical center of inductance 12 and to the ground potential point of the cathodes $1a$ and $2a$. Electron discharge device 17 is associated with the transformer 16. Telephones or a similar observing device 19 is connected together with the source 18 into the output circuit of the device 17. Several electron discharge devices with proper connecting circuits well known in the art may be provided in place of the device 17 if it is desirable to further amplify the output from the transformer 16.

Inductances 20, 21, 22 and 23 which may be coil, frame or other well known types of antennæ having both inductance and capacity are connected to the input circuits of the electron discharge devices 1 and 2. In operation the anode circuit of the electron discharge device 1 is energized when the terminal $12a$ of the inductance 12 is positive with respect to the terminal $12b$. Energy modulated in accordance with signaling energy impressed upon the control electrode circuit of the device 1 is then impressed upon the circuits of the amplifier 17 through the coupling device 16. When the terminal $12b$ of the inductance 12 is positive with respect to the terminal $12a$ the anode circuit of the device 2 is energized. Energy modulated in accordance with signaling energy impressed upon the control electrode circuit of the device 2 is then impressed upon the circuits of the amplifier 17 through the coupling device 16. The anode circuits of the electron discharge devices 1 and 2 are alternately and periodically energized through the action of the low frequency oscillation generator 15. The frequency of the oscillation generator 15 may be varied by varying either the capacity 14 or the inductance 13; the rate at which the anode circuits of the devices 1 and 2 are energized is thereby also varied. An important advantage in being able to vary the frequency of the oscillation generator is apparent where the system comprising this invention is to be used for the reception of both guiding signals and distress signals. The oscillation generator 15 is preferably caused to generate oscillations of a relatively low frequency, 200 cycles per second for example.

The response obtained through device 19 is then substantially constant irrespective of whether both of the devices 1 and 2 are functioning. Signals from several directions are then impressed upon the observing circuit in rapid succession in such a manner that the difference between signals impressed upon the observing circuit through the action of device 1 can not be perceived from signals impressed upon the observing circuit through the action of device 2.

Steady response from distress signals is then obtained. Once a distress signal is heard the frequency of the oscillation generator 15 may be decreased and the direction from which the signal is coming determined by comparing the relative intensity of signals in the response device 19 corresponding to each coil antenna.

Figs. 2 and 4 show an embodiment of my invention wherein a pair of vertical or capacitive antennæ 29 and 38 are mounted for rotation in fixed relation to another pair of loop antennæ 25 and 26. Antennæ of various designs well-known in the art may be substituted for those shown. The circuit connections of the complete antenna system may, however, be such that the loop 25 and the capacitive antenna 38 are intercoupled through inductances 33 and 34 while the loop 26 and the capacitive antenna 29 are intercoupled by inductances 27 and 28. A resonant circuit is also provided for each of the capacitive antennæ 29 and 39 by placing condensers 30 and 35 in shunt with the inductances 28 and 34, respectively. A wide range of adjustability for each resonant circuit such as 28—30 or 34—35 may be provided by the auxiliary condensers 31 and 36, respectively, these being adapted to be thrown into their respective resonant circuits by means of switches 32 and 37. The capacitive antennæ 29 and 38 are preferably spaced apart not more than one half of the wave length of the signals to be received. The entire system, including antennæ and receiving apparatus presently to be described may be mounted for rotation upon a platform 47 which is supported by the post 52. In case a ground connection is required, this may be readily provided by the sliding contact 49, the metallic ring 50 and the ground wire 51. All of the receiving apparatus other than the antennæ and the head phones 19 may, of course, be housed in a suitable cabinet 48.

The vertical antenna 29 is coupled to the input circuit of device 1 through the inductances 27 and 28. Capacities 30 and 31 are provided in circuit with the inductance 28 for tuning the antenna 29. These capacities also serve to alter the phase relation of oscillations impressed upon the input circuit of electron discharge device 1 with respect to oscillations impressed upon the input circuit from loop 26 whereupon a condition similar to that obtained when an antenna having a unidirectional field intensity characteristic is employed. Similarly the phase relation between the oscillations impressed upon the input circuit of electron discharge device 2 from the antenna 38 and loop antenna 25 is adjusted by employing either one or both of condensers 35 and 36 so as to obtain a maximum response on signals from one direction. Switches 32 and 37 are connected in such a manner that condensers 31 and 36 respectively, may be either connected into circuit with the antennæ 29 and 38 or disconnected therefrom. Greater wave length range is thus possible with antennæ 29 and 38 of a given dimension. The condenser 7 is connected in series with the inductance 27 and loop antenna 26. Condenser 8 is connected in series with the inductance 33 and the loop antenna 25. The loop antenna 26 and the loop antenna 25 are coaxially disposed with respect to each other at an angle of approximately 90°.

The embodiment of my invention shown in Figs. 2 and 4 may be understood to operate as follows:

The combined effect of the signal response derived from the loop antenna 25 and the vertical antenna 38 to which it is coupled will be observed to vary in intensity as the platform 47 supporting the entire system is rotated. The intensity of the signal response derived from the loop antenna 26 to which the vertical antenna 29 is coupled will also vary as the system is rotated but maximum intensity will not be coincident with that of the signals derived from the antennæ 35 and 38. Since the signals impressed upon the tubes 1 and 2 from the respectively intercoupled antennæ may be heard alternately due to the audible frequency at which the tubes 1 and 2 are successively excited by the oscillator system, it will be seen that the antennæ may be rotated until the intensities of alternate signals are equalized and thus the direction of the source of the signals may be ascertained.

A composite system in which an antenna 40 is coaxially disposed with respect to loop antennæ 41 and 42 is shown in Fig. 3. The loop antenna 41 is coupled to the antenna 40 through the inductances 43 and 44. The loop antenna 42 is coupled to the antenna 40 through inductances 43 and 45. Capacity 7 is connected to the circuit of inductance 45 and loop antenna 42 for tuning the circuit to a definite frequency. Tuning capacity 8 is connected into the circuit of inductance 44 and loop 41. Antenna tuning capacity 46 is connected to inductance 43 and the cathode circuit of the electron discharge devices 1 and 2. An additional capacity similar to condenser 46 may be connected in parallel with the inductance 43. Signaling energy intercepted by the antennæ 40, 41 and antennæ 40, 42 is impressed upon the input circuits of electron discharge devices 2 and 1, respectively.

The effect of the field distribution of the loop 41 upon the field distribution of the antenna 40 is such that the resulting field distribution is heart shaped in the direction of the loop. The effect of the field distribution of loop 42 upon the field of antenna 40 is similar to that of loop 41 in the direction of loop 42. As the anode circuits of electron discharge devices 1 and 2 are alternately energized the observing device 19 is energized periodically by energy modulated in accordance with signaling energy intercepted first by antenna 40 and loop 41 and next by antenna 40 and loop 42. By rotating the loops 41 and 42 about their axis the direction of the signaling energy emission system is readily determined.

While I have described my invention in several preferred embodiments I realize that many modifications thereof may be made, therefore I do not intend that this invention be limited by the foregoing specification but by the hereunto annexed claims.

What I claim as new and desire to secure by Letters Patent of the United States is as follows:

1. In a radio direction finding system, a pair of receiving systems each comprising at least one electron tube having an input circuit and an output circuit, a directional and a non-directional antenna the circuits of which are intercoupled with one another and arranged to supply input potentials to one of said electron tubes, a corresponding arrangement of directional and non-directional antennæ the directional effect of which is different from that of the first said antennæ but arranged to supply input potentials to the electron tube in the other of said receiving systems, means including a low frequency oscillation generator for supplying anode current to said electron tubes, a signal observing device coupled to the output circuits of said receiving systems and means for varying the frequency of said oscillation generator whereby the alternate effects of the two receiving systems may be impressed upon said observing device in more or less rapid succession.

2. In a radio direction finding system, a pair of coil antennæ mounted substantially at right angles, a capacity antenna disposed in symmetrical relation to said coil antennæ, said coil antennæ and said capacity antenna being assembled for rotation as a unit, a pair of electron tubes, balanced input and output circuits therefor, the terminals of each of said coil antennæ being connected to the input electrode of each of said tubes respectively, means coupling said capacity antenna with the input circuits of each of said tubes, the anodes of said tubes being connected to the respective terminals of one winding of a transformer, a tuned path connected across said transformer winding and between said anodes the mid-tap of said winding being connected through the primary winding of an output transformer and returning to the cathodes of said tubes, a signal responsive device connected to the secondary of said output transformer, a generator of alternating current of audible frequency, the other winding of said first mentioned transformer being connected to said audible frequency generator, whereby the characteristics of the signals received in said signal responsive device indicate the orientation of said rotatable assembly of antennæ with respect to an incoming radio wave.

3. In a radio direction finding system, a pair of coil antennæ mounted substantially at right angles, a capacity antenna disposed in symmetrical relation to said coil antennæ, said coil antennæ and said capacity antenna being assembled for rotation as a unit, means including a transformer having three windings each of which connects respectively with one of said antennæ and tuning condensers in circuit with each of the windings thereof for rendering each of said antenna circuits resonant to a desired frequency, a pair of electron tubes each having an input circuit in electrical connection with one of said antennæ and the resonant circuit thereof, a balanced resonant output circuit arrangement comprising a transformer the terminals of one winding thereof being connected respectively with the anodes of said tubes and the mid-tap of said winding being connected through the primary winding of an output transformer with a common grounded circuit to the cathodes of said tubes, a signal responsive device connected to the secondary of said output transformer, a generator of alternating current of audible frequency, means for substantially varying the frequency of said generator within the audible range, the other winding of said transformer of the balanced output circuit arrangement being connected to said audible frequency generator, whereby the characteristics of the signals received in said signal responsive device indicate the orientation of said rotatable assembly of antennæ with respect to an incoming radio wave.

4. In a radio direction finding system, a pair of coil antennæ mounted substantially at right angles, a pair of capacity antennæ each in symmetrical relation to one of said coil antennæ, said coil antennæ and said capacity antennæ being assembled for rotation as a unit, a tuned path to ground connected with said capacity antenna, a pair of electron tubes, balanced input and output circuits therefor, the terminals of each of said coil antennæ being connected to the input of each of said tubes respectively, means coupling said capacity antenna with the input circuits of each of said tubes, the anodes of said tubes being connected to the respective terminals of one winding of a transformer, a tuned path connected in shunt with said transformer winding, the mid-tap of said winding being connected through the primary winding of an output transformer and returning to the cathodes of said tubes, a signal responsive device connected to the secondary of said output transformer, a generator of alternating current of audible frequency, the other winding of said first mentioned transformer being connected to said audible frequency generator, whereby the characteristics of the signals received in said signal responsive device indicate the orientation of said rotatable assembly of antennæ with respect to an incoming radio wave.

5. In a radio direction finding system, a pair of coil antennæ mounted substantially at right angles, a pair of capacity antennæ each in symmetrical electrical relation with one of said coil antennæ, said coil antennæ and said capacity antennæ being assembled for rotation as a unit, a resonant path to ground connected with each of said capacity antennæ, two electron tubes, balanced input and output circuits therefor, the terminals of each of said coil antennæ being connected to the input of each of said tubes respectively, the anodes of said tubes being connected to the respective terminals of one winding of a transformer, a tuned path connected in shunt with said transformer winding, the mid-tap of said winding being connected through the primary winding of an output transformer and returning to the cathodes of said tubes, a signal responsive device connected to the secondary of said output transformer, a generator of alternating current of audible frequency, means for substantially varying the frequency of said generator within the audible range, the other winding of said first mentioned transformer being connected to said audible frequency generator, whereby the characteristics of the signals received in said signal responsive device indicate the orientation of said rotatable assembly of antennæ with respect to an incoming radio wave.

6. In a radio direction finding system, a pair of coil antennæ mounted substantially at right angles, a pair of capacity antennæ each in electrical relation with one of said coil antennæ, means in the circuit of each of said capacity antennæ for varying the relation of the phase of the oscillations therein which are impressed upon its corresponding coil antenna circuit, said coil antennæ and said capacity antennæ being assembled for rotation as a unit, a pair of electron tubes, balanced input and output circuits therefor, the terminals of each of said coil antennæ being connected to the input of each of said tubes respectively, the anodes of said tubes being connected to the respective terminals of one winding of a transformer, the mid-tap of said winding being connected through the primary winding of an output transformer to the cathodes of said tubes, a signal responsive device connected to the secondary of said output transformer, a generator of alternating current of audible frequency, the other winding of said first mentioned transformer being connected to said audible frequency generator, whereby the characteristics of the signals received in said signal responsive device indicate the orientation of said rotatable assembly of antennæ with respect to an incoming radio wave.

7. In a radio direction finding system, a pair of coil antennæ mounted substantially at right angles, a pair of capacity antennæ each in electrical relation with one of said coil antennæ, means in the circuit of each of said capacity antennæ for varying the relation of the phase of the oscillations therein which are impressed upon its corresponding coil antenna circuit, said means consisting of an inductance, a variable condenser in shunt with said inductance, a variable condenser in series with said inductance, and a switch adapted to connect or disconnect said series condenser in the circuit of said inductance, said coil antennæ and said capacity antennæ being assembled for rotation as a unit, a pair of electron tubes, balanced input and output circuits therefor, the terminals of each of said coil antennæ being connected to the input of each of said tubes respectively, the anodes of said tubes being connected to the respective terminals of one winding of a transformer, the mid-tap of said winding being connected through the primary winding of an output transformer to the cathodes of said tubes, a signal responsive device connected to the secondary of said output transformer, a generator of alternating current of audible frequency, the other winding of said first mentioned transformer being connected to said audible frequency generator, whereby the characteristics of the signals received in said signal responsive device indicate the orientation of said rotatable assembly of antennæ with respect to an incoming radio wave.

JOHN A. WILLOUGHBY.